US012768705B2

(12) United States Patent
Kamigaito et al.

(10) Patent No.: US 12,768,705 B2
(45) Date of Patent: Oct. 20, 2026

(54) COMBINATION WEIGHING APPARATUS FOR PERFORMING COMBINATION CALCULATION TO REDUCE FREQUENCY OF DETECTIVE DISCHARGE

(71) Applicant: ISHIDA CO., LTD., Kyoto (JP)

(72) Inventors: Satoru Kamigaito, Ritto (JP); Kazuaki Takamori, Ritto (JP); Mikio Kishikawa, Ritto (JP); Kazuhisa Chimura, Ritto (JP); Tsuyoshi Ishibashi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 310 days.

(21) Appl. No.: 18/611,111

(22) Filed: Mar. 20, 2024

(65) Prior Publication Data

US 2024/0328847 A1 Oct. 3, 2024

(30) Foreign Application Priority Data

Mar. 27, 2023 (JP) ................................ 2023-049770

(51) Int. Cl.
*G01G 19/393* (2006.01)
*G01G 19/414* (2006.01)

(52) U.S. Cl.
CPC ......... *G01G 19/393* (2013.01); *G01G 19/414* (2013.01)

(58) Field of Classification Search
CPC .......................... G01G 19/393; G01G 19/414
See application file for complete search history.

(56) References Cited

U.S. PATENT DOCUMENTS 4,313,507 A * 2/1982 Hays .................... G01G 19/393 177/1
2004/0104054 A1* 6/2004 Kageyama ........... G01G 19/393 177/119

(Continued)

FOREIGN PATENT DOCUMENTS

CN 108389315 A * 8/2018 ............. G07F 11/00
JP 2004-177375 A 6/2004
JP 2010-043999 A 2/2010

OTHER PUBLICATIONS

The extended European search report issued by the European Patent Office on Aug. 9, 2024, which corresponds to European Patent Application No. 24165210.6-1001 and is related to U.S. Appl. No. 18/611,111.

*Primary Examiner* — Natalie Huls
(74) *Attorney, Agent, or Firm* — Studebaker Brackett PLLC

(57) ABSTRACT

A combination weighing apparatus (1) according an embodiment includes: a conveyance unit (2, $\mathbf{3}_1$ to $\mathbf{3}_n$) that conveys articles (M) given from an outside; a plurality of weighing hoppers ($\mathbf{6}_1$ to $\mathbf{6}_n$) that temporarily store the articles (M) conveyed by the conveyance unit (2, $\mathbf{3}_1$ to $\mathbf{3}_n$) and then discharge the articles (M) downstream; a weighing unit ($\mathbf{7}_1$ to $\mathbf{7}_n$) that weighs a weight value of the article (M) stored in each of the plurality of weighing hoppers ($\mathbf{6}_1$ to $\mathbf{6}_n$); and a control unit (20) that performs combination calculation based on a plurality of the weight values measured by the weighing unit ($\mathbf{7}_1$ to $\mathbf{7}_n$) and a target value (X) and discharges a specific article (M) selected by the combination calculation from the weighing hopper ($\mathbf{6}_1$ to $\mathbf{6}_n$), wherein the control unit (20): multiplies an average weight (m) value per unit number of articles (M) within a predetermined period by the number (C) of articles (M), calculates a multiplication result closest to the target value (X) from among results of the (Continued)

multiplication as a reference weight value ($T_{cm}$), and performs predetermined processing based on a difference between the target value (X) and the reference weight value ($T_{cm}$).

5 Claims, 4 Drawing Sheets

(56) References Cited

U.S. PATENT DOCUMENTS

| | | | | |
|---|---|---|---|---|
| 2009/0236150 | A1* | 9/2009 | Kono | G01G 19/384<br>177/52 |
| 2018/0274969 | A1* | 9/2018 | Nagai | B65B 57/145 |
| 2022/0307892 | A1* | 9/2022 | Fukumoto | G01G 19/393 |

* cited by examiner

COMBINATION WEIGHING APPARATUS FOR PERFORMING COMBINATION CALCULATION TO REDUCE FREQUENCY OF DETECTIVE DISCHARGE

CROSS-REFERENCE TO RELATED APPLICATIONS

This application is based upon and claims the benefit of priority from Japanese Patent Application No. 2023-049770 filed on Mar. 27, 2023 in Japan, the entire contents of which are incorporated herein by reference.

TECHNICAL FIELD

The present invention relates to a combination weighing apparatus.

BACKGROUND ART

Conventionally, there is known a combination weighing apparatus that performs combination calculation based on weight values and a target value of a plurality of weighed articles and discharges a specific article selected by the combination calculation from a weighing hopper.

SUMMARY OF THE INVENTION

However, in the conventional combination weighing apparatus, in a case of an article having a large individual weight such as broiler breast meat or thigh meat, there is a problem that it is not possible to find an appropriate combination of the articles corresponding to the target value, and the weight of the combination becomes excessive, resulting in defective discharge.

Therefore, the present invention has been made in view of the above problems, and an object of the present invention is to provide a combination weighing apparatus capable of reducing a frequency of defective discharge in combination calculation for articles each having a large individual weight.

A combination weighing apparatus according to an embodiment is summarized as a combination weighing apparatus having: a conveyance unit that conveys articles given from an outside; a plurality of weighing hoppers that temporarily store the articles conveyed by the conveyance unit and then discharge the articles downstream; a weighing unit that weighs a weight value of the article stored in each of the plurality of weighing hoppers; and a control unit that performs combination calculation based on a plurality of the weight values measured by the weighing unit and a target value and discharges a specific article selected by the combination calculation from the weighing hopper, wherein the control unit: multiplies an average weight value per unit number of articles within a predetermined period by the number of articles, calculates a multiplication result closest to the target value from among results of the multiplication as a reference weight value, and performs predetermined processing based on a difference between the target value and the reference weight value.

According to the present invention, it is possible to provide a combination weighing apparatus capable of reducing a frequency of defective discharge in combination calculation for articles each having a large individual weight.

DESCRIPTION OF EMBODIMENTS

Figure 1:
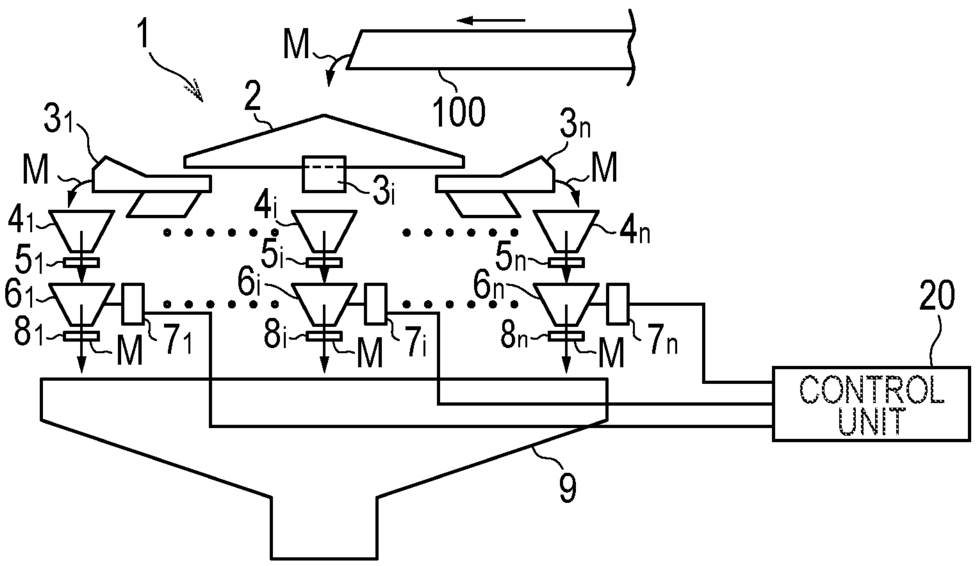
FIG. 1 is a diagram illustrating an example of an overall configuration of a combination weighing apparatus according to an embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

Figure 2:
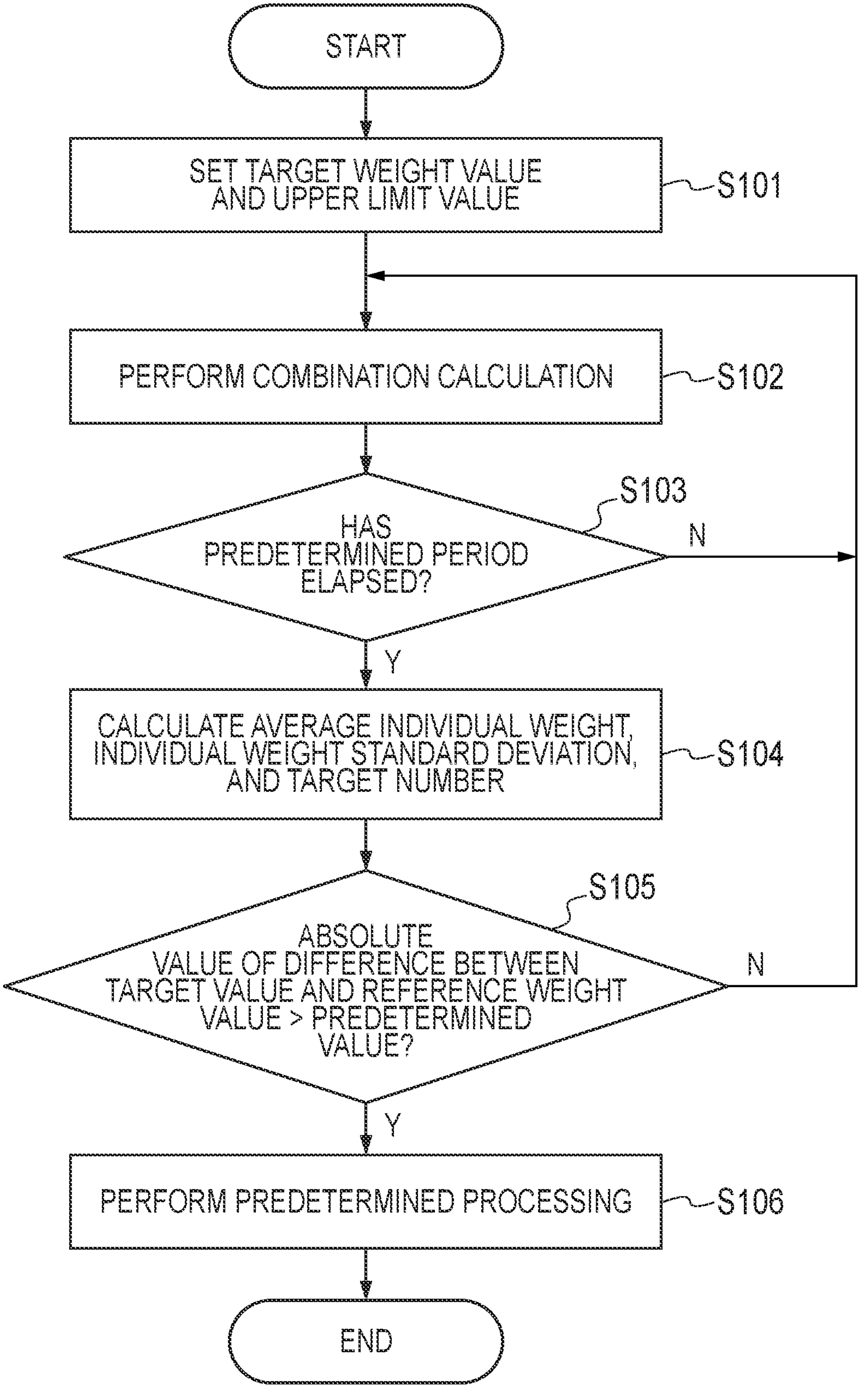
FIG. 2 is a flowchart illustrating an example of an operation of a control unit of the combination weighing apparatus according to the embodiment.
Figure 3:
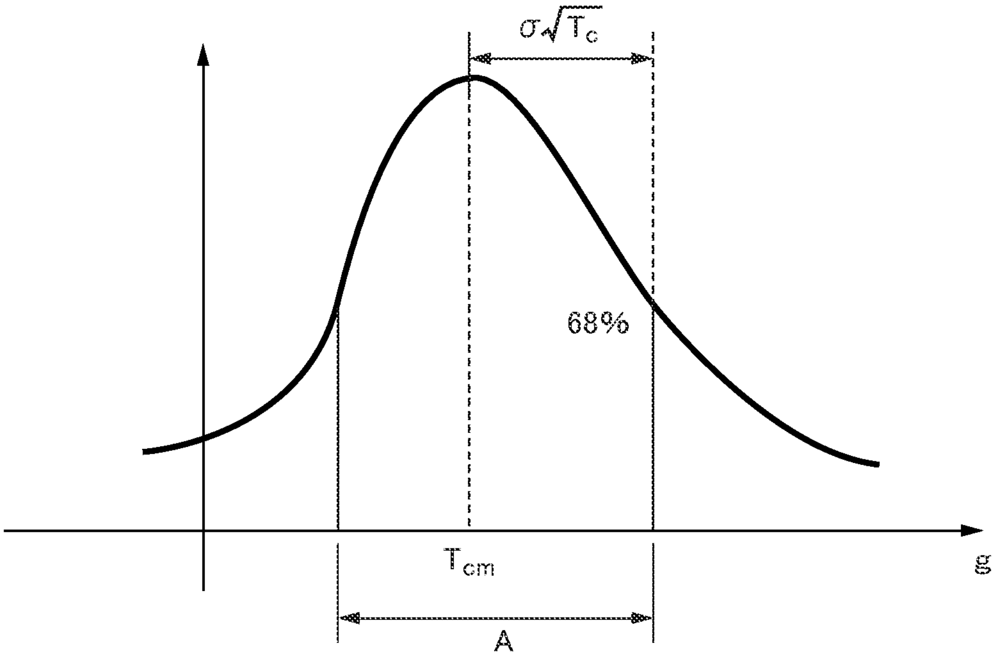
FIG. 3 is a diagram for describing the example of the operation of the control unit of the combination weighing apparatus according to the embodiment.
Figure 4:
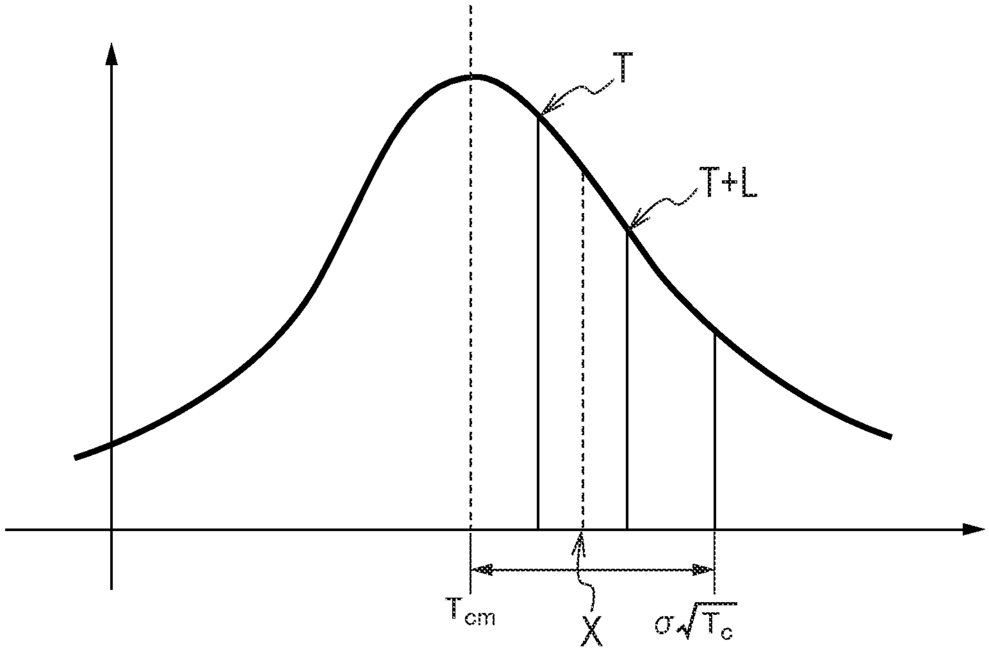
FIG. 4 is a diagram for describing the example of the operation of the control unit of the combination weighing apparatus according to the embodiment.

Hereinafter, a combination weighing apparatus 1 according to a first embodiment of the present invention will be described with reference to FIGS. 1 to 4. FIG. 1 is a diagram illustrating an example of an overall configuration of the combination weighing apparatus 1 according to the present embodiment. FIG. 2 is a flowchart illustrating an example of an operation of a control unit 20 of the combination weighing apparatus 1 according to the present embodiment. FIGS. 3 and 4 are diagrams for describing the example of the operation of the control unit 20 of the combination weighing apparatus 1 according to the present embodiment.

As illustrated in FIG. 1, the combination weighing apparatus 1 according to the present embodiment includes a distribution table 2, a plurality of supply troughs $3_1$ to $3_n$, a plurality of pool hoppers $4_1$ to $4_n$, a plurality of weighing hoppers $6_1$ to $6_n$, a collection chute 9, and a control unit 20.

As illustrated in FIG. 1, a conveyor 100 drops articles M, which are objects to be weighed, to a central portion of the distribution table 2 of the combination weighing apparatus 1.

The distribution table 2 and each of the supply troughs $3_1$ to $3_n$ are vibrated by the drive of a vibrator, so that the articles M on the distribution table 2 are supplied to the multiple pool hoppers $4_1$ to $4_n$ provided downstream of the supply troughs $3_1$ to $3_n$, respectively. Here, the distribution table 2 and each of the supply troughs $3_1$ to $3_n$ constitute a conveyance unit that conveys the articles M given from the outside.

The respective pool hoppers $4_1$ to $4_n$ are provided with gates $5_1$ to $5_n$, and temporarily house and store the articles M supplied and received from the corresponding supply troughs $3_1$ to $3_n$.

The weighing hoppers $6_1$ to $6_n$ are provided downstream of the pool hopper $4_1$ to $4_n$, respectively. The weighing hoppers $6_1$ to $6_n$ are provided with weighing headers including weight detectors $7_1$ to $7_n$ for weighing the articles M given from the pool hoppers $4_1$ to $4_n$ and gates $8_1$ to $8_n$. The collection chute 9 is provided below the gate $8_1$ to $8_n$ of the respective weighing hoppers $6_1$ to $6_n$.

Here, each of the weighing hoppers $6_1$ to $6_n$ temporarily stores the article M conveyed from the distribution table 2 and each of the supply troughs $3_1$ to $3_n$, and then discharges the article M downstream.

The weight detectors $7_1$ to $7_n$ constitute a weighing unit that weighs a weight value of the article M stored in each of the plurality of weighing hoppers $6_1$ to $6_n$.

The control unit 20 performs combination calculation based on the weight values of a plurality of articles M measured by the weight detectors $7_1$ to $7_n$ and a target value X, and discharges a specific article M selected by the combination calculation from the weighing hoppers $6_1$ to $6_n$.

Hereinafter, an example of the operation of the control unit 20 of the combination weighing apparatus 1 according to the present embodiment will be described with reference to FIGS. 2 to 4.

As illustrated in FIG. 2, in step S101, the control unit 20 sets a target weight value T and an upper limit value L in advance.

Here, the target weight value T is a target numerical value at the time of combination calculation. In short, the target weight value T is a numerical value achieved by combining the weight values of the articles M housed in the respective weighing hoppers $6_1$ to $6_n$. Further, the upper limit value L is a value for setting a maximum weight value that can be allowed in the combination calculation.

That is, the control unit 20 sets the target weight value T in principle, and performs combination calculation with the target weight value T+ the upper limit value L as a maximum value. The target weight value T and the upper limit value L may be set in accordance with an input by an operator, or may be automatically set by the control unit 20.

In step S102, the control unit 20 performs combination calculation based on the weight values, the target weight value T, and the upper limit value L of the plurality of articles M weighed by the weight detectors $7_1$ to $7_n$.

In step S103, the control unit 20 determines whether or not a predetermined period has elapsed. In a case where it is determined that the predetermined period has elapsed, the operation proceeds to step S104, and in a case where it is determined that the predetermined period has not elapsed, the operation returns to step S102.

For example, the predetermined period may be defined by the number of times the combination calculation has been performed by the combination weighing apparatus 1. In addition, the predetermined period may be defined by the number of times the combination weighing apparatus 1 has actually discharged the articles M. Further, the combination weighing apparatus 1 may include a timer, and the predetermined period may be defined by a preset set time.

In step S104, the control unit 20 calculates an average individual weight m, an individual weight standard deviation σ, and a target number $T_C$. Here, the average individual weight m is an average weight value per unit number of articles M within a predetermined period. The individual weight standard deviation σ is a weight value standard deviation per unit number of articles M. The control unit 20 calculates the average individual weight m and the individual weight standard deviation σ based on the weight values of the articles M housed in the weighing hoppers $6_1$ to $6_n$ in the past. Here, the control unit 20 performs calculation based on the weight value used for combination calculation a plurality of times most recently.

Furthermore, the control unit 20 multiplies the average individual weight m by the number C (for example, C=1, 2, . . . , or n) of articles M, and calculates a multiplication result closest to the target weight value T from among the multiplication results as a reference weight value $T_{cm}$. Then, the control unit 20 sets the number C of articles M corresponding to the reference weight value $T_{cm}$ as the target number $T_C$.

Here, in a normal distribution related to the weight values (average individual weight m× target number $T_C$) of one or more articles M illustrated in FIG. 3, a median value is the reference weight value $T_{cm}$. Furthermore, in such a normal distribution, weight values of 68% of the entire combination calculation are included within a range A of $\pm\sigma\sqrt{T_C}$ from the median value.

In step S105, the control unit 20 determines whether or not an absolute value $|X-T_{cm}|$ of a difference between the target value X and the reference weight value $T_{cm}$ is larger than a predetermined value. In a case where affirmative determination (Yes) is made, the operation proceeds to step S106, and in a case where negative determination (No) is made, the operation returns to step S102. Here, as illustrated in FIG. 4, the target value X is an average value of the target weight value T and a value (T+L) obtained by adding the upper limit value L to the target weight value T.

Here, the predetermined value is calculated based on the reference weight value $T_{cm}$, the individual weight standard deviation σ, and the target number $T_C$. For example, the predetermined value may be calculated by $A\times\sigma\times\sqrt{T_C}$. Note that A is a parameter that changes depending on a required defect rate, and is assumed to take a value in a range of 0 to 1.

In step S106, the control unit 20 performs predetermined processing. That is, the control unit 20 performs predetermined processing based on the difference $|X-T_{cm}|$ between the target value X and the reference weight value $T_{cm}$.

For example, the control unit 20 may change a set value (for example, the target weight value T, the upper limit value L, or the like) used for the above-described combination calculation as the predetermined processing. In particular, the control unit 20 may change the target weight value T as the predetermined processing.

With such a configuration, $T-T_{cm}$ decreases, and thus, a frequency of discharge of a correctly weighed product increases as a result of combination calculation, and an operation rate can be increased.

Alternatively, as the predetermined processing, the control unit 20 may notify the operator of a determination result as to whether or not the absolute value $|X-T_{cm}|$ of the difference between the target value X and the reference weight value $T_{cm}$ is larger than a predetermined value.

With such a configuration, even in a case of articles M whose average individual weight or individual weight standard deviation (dispersion) changes depending on an arrival lot, such as broiler breast meat or thigh meat, a frequency of defective discharge in combination calculation can be reduced by mixing articles having different average individual weights included in different lots by performing the above-described notification.

In the above example, a case where the target weight value T or the upper limit value L is used as the set value (that is, the value set in advance in step S101) used in the combination calculation is described. However, the present invention is not limited to such a case, and can be applied to, for example, a case where a lower limit value or the like is used as the set value.

According to the present embodiment, even in a case of articles each of which has a large individual weight and of which an average individual weight or individual weight standard deviation (dispersion) changes depending on an arrival lot, such as broiler breast meat or thigh meat, it is possible to reduce the frequency of defective discharge in combination calculation.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. A combination weighing apparatus comprising:

a conveyance unit that conveys articles given from an outside;

a plurality of weighing hoppers that temporarily store the articles conveyed by the conveyance unit and then discharge the articles downstream;

a weighing unit that measures a weight value of one of the articles stored in each of the plurality of weighing hoppers; and a control unit that performs a combination calculation based on a plurality of the weight values measured by the weighing unit and a target value and discharges a specific article selected by the combination calculation from one of the plurality of weighing hoppers, wherein the control unit:

performs a plurality of multiplications of an average weight value per unit number of the articles within a predetermined period in the past by a number of articles, the number of articles in each of the plurality of multiplications being a different integer, calculates a multiplication result closest to a target weight value from among results of the plurality of multiplications as a reference weight value, and performs predetermined processing based on a difference between the target value and the reference weight value.

2. The combination weighing apparatus according to claim 1, wherein in a case where it is determined that an absolute value of the difference between the target value and the reference weight value is larger than a predetermined value, the control unit changes a set value of one or more set values used in the combination calculation, as the predetermined processing.

3. The combination weighing apparatus according to claim 2, wherein the control unit changes the target weight value among the set values.

4. The combination weighing apparatus according to claim 2, wherein the control unit calculates, from the plurality of weight values, the average weight value, the number of articles corresponding to the reference weight value, and a weight value standard deviation per unit number of articles, the target weight value and an upper limit value are set in advance, the target value is an average value of the target weight value and a value obtained by adding the upper limit value to the target weight value, and the predetermined value is calculated based on the reference weight value, the standard deviation, and the number corresponding to the reference weight value.

5. The combination weighing apparatus according to claim 1, wherein in a case where it is determined that an absolute value of the difference between the target value and the reference weight value is larger than a predetermined value, the control unit notifies an operator of a result of the determination, as the predetermined processing.

* * * * *